(12) United States Patent
Woo (10) Patent No.: US 8,213,141 B2
(45) Date of Patent: Jul. 3, 2012

(54) POWER OVER ETHERNET ELECTROSTATIC DISCHARGE PROTECTION CIRCUIT

(75) Inventor: Agnes Woo, Encino, CA (US)

(73) Assignee: Broadcom Corporation, Irvine, CA (US)

( * ) Notice: Subject to any disclaimer, the term of this patent is extended or adjusted under 35 U.S.C. 154(b) by 744 days.

(21) Appl. No.: 11/653,888

(22) Filed: Jan. 17, 2007

(65) Prior Publication Data

US 2007/0165345 A1 Jul. 19, 2007

Related U.S. Application Data

(60) Provisional application No. 60/758,984, filed on Jan. 17, 2006.

(51) Int. Cl.
*H02H 9/00* (2006.01)
*H02H 3/22* (2006.01)
*H02H 9/06* (2006.01)
*H02H 1/00* (2006.01)
*H02H 1/04* (2006.01)
*H01C 7/12* (2006.01)

(52) U.S. Cl. ............ 361/56; 361/111; 361/119
(58) Field of Classification Search ............ 361/56
See application file for complete search history.

(56) References Cited

U.S. PATENT DOCUMENTS

| | | | |
|---|---|---|---|
| 5,793,588 A * | 8/1998 | Jeong | 361/56 |
| 5,838,145 A | 11/1998 | Poon et al. | |
| 5,943,226 A | 8/1999 | Kim | |
| 6,028,465 A * | 2/2000 | So | 327/321 |
| 6,184,659 B1 | 2/2001 | Darmawaskita | |
| 6,198,342 B1 | 3/2001 | Kawai | |
| 6,280,081 B1 | 8/2001 | Blau et al. | |
| 6,304,472 B1 | 10/2001 | Nagasu et al. | |
| 6,385,116 B2 * | 5/2002 | Wang | 365/226 |
| 6,456,044 B1 | 9/2002 | Darmawaskita | |
| 6,480,057 B2 | 11/2002 | Ogura | |
| 6,535,983 B1 | 3/2003 | McCormack et al. | |
| 6,734,717 B2 | 5/2004 | Min | |
| 6,770,938 B1 * | 8/2004 | Fliesler et al. | 257/357 |
| 6,798,177 B1 | 9/2004 | Liu et al. | |
| 6,924,963 B2 * | 8/2005 | Young et al. | 361/111 |

(Continued)

OTHER PUBLICATIONS 802.3af™, *IEEE Standard for Information Technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Data Terminal Equipment (DTE) Power via Media Dependent Interface (MDI)*, IEEE Computer Society, IEEE, New York, NY, ISBN 0-7381-3696-4 (SH95132) (Print), ISBN 0-7381-3697-2 (SS95132) (PDF), Jun. 18, 2003, pp. i-ix and 1-121 (133 pages total).

(Continued)

*Primary Examiner* — Jared Fureman
*Assistant Examiner* — Lucy Thomas
(74) *Attorney, Agent, or Firm* — Sterne, Kessler, Goldstein & Fox P.L.L.C.

(57) ABSTRACT

A Power over Ethernet electrostatic discharge protection circuit has a first diode with an anode coupled to a positive power port and a cathode coupled to an ESD protection port. A second diode has an anode coupled to ground and a cathode coupled to the positive power port. A third diode has an anode coupled to a negative power port and a cathode coupled to the ESD protection port.

12 Claims, 5 Drawing Sheets

U.S. PATENT DOCUMENTS

| | | | |
|---|---|---|---|
| 6,940,737 B2 | 9/2005 | Nakazawa et al. | |
| 6,960,949 B2 | 11/2005 | Suzuki | |
| 7,050,315 B2 | 5/2006 | Itoh | |
| 7,098,510 B2 * | 8/2006 | Kodama et al. | 257/355 |
| 7,281,141 B2 | 10/2007 | Elkayam et al. | |
| 7,417,877 B2 | 8/2008 | Leung et al. | |
| 7,492,108 B2 | 2/2009 | Garcia et al. | |
| 2003/0099076 A1 | 5/2003 | Elkayam et al. | |
| 2003/0155963 A1 | 8/2003 | Huang | |
| 2004/0164619 A1 * | 8/2004 | Parker et al. | 307/80 |
| 2004/0201931 A1 | 10/2004 | Korcharz et al. | |
| 2005/0162202 A1 | 7/2005 | Suzuki | |
| 2006/0092000 A1 | 5/2006 | Karam et al. | |
| 2006/0112285 A1 | 5/2006 | Stineman | |
| 2006/0132220 A1 | 6/2006 | Lee | |
| 2006/0164775 A1 | 7/2006 | Stineman et al. | |
| 2006/0215343 A1 * | 9/2006 | Camagna et al. | 361/111 |
| 2007/0165548 A1 | 7/2007 | Woo | |
| 2007/0170909 A1 | 7/2007 | Vorenkamp et al. | |
| 2007/0206774 A1 | 9/2007 | Vorenkamp et al. | |
| 2008/0040625 A1 | 2/2008 | Vorenkamp et al. | |

OTHER PUBLICATIONS

International Search Report for PCT/US2007/001119, Filed Jan. 17, 2007, 14 pages.

Mendelson, G., "All You Need to Know About Power over Ethernet (PoE) and the IEEE 802.3af Standard," Internet Citation, [Online] Jun. 2004, XP002372480 Retrieved from the Internet: <URL:http://www.powerdsine.com/Documentation/WhitePapers/PoE_and_IEEE802_3af.pdf>.

* cited by examiner

POWER OVER ETHERNET ELECTROSTATIC DISCHARGE PROTECTION CIRCUIT

CROSS REFERENCE TO RELATED APPLICATIONS

This application claims benefit of U.S. Provisional Patent Application No. 60/758,984, filed on Jan. 17, 2006, which is incorporated by reference herein in its entirety.

FIELD OF THE INVENTION

The present invention generally relates to Power over Ethernet (PoE) devices, and more specifically to electrostatic discharge protection.

BACKGROUND OF THE INVENTION

Ethernet communications provide high speed data communications over a communications link between two communications nodes that operates according the IEEE 802 Ethernet Standard. The communications medium between the two nodes can be twisted pair wires for Ethernet, or other types communications medium that are appropriate. Power over Ethernet (PoE) communication systems provide power and data communications over a common communications link. More specifically, a power source device (PSE) coupled to the physical layer of the first node of the communications link provides DC power (for example, 48 volts DC) to a powered device (PD) at the second node of the communications link. The DC power is transmitted simultaneously over the same communications medium with the high speed data from one node to the other node.

Example PD devices that utilize PoE include Internet Protocol (IP) phones, wireless access points, etc. The PSE device typically includes a serial-to-parallel (i.e. SERDES) transceiver, and/or a PHY device, to support high speed serial data transport. Herein, data ports and their corresponding links can be interchangeably referred to as data channels, communication links, data links, etc, for ease of discussion. The PSE device also includes a PSE controller that performs initialization and power flow control to the PD device.

PoE integrated circuits are sensitive to electrostatic discharge (ESD). ESD occurs when a static charge discharges. The static charge may have a high voltage of several thousand kilovolts. When the ESD voltage exceeds a spark gap voltage of an insulator, the electrostatic charge discharges through the insulator in an ESD event.

An ESD event may occur during handling of the PoE integrated circuit, such as during a manufacturing process. An ESD event may also occur during normal operation of a PoE integrated circuit. For example, an electrostatic charge on a cable may discharge via a PoE integrated circuit port during connection of a cable to the port.

An ESD event may render an unprotected PoE integrated circuit inoperative by destroying layers of a sensitive internal circuit. PoE integrated circuits are miniature in size. Spark gap voltage decreases as insulator thickness decreases. Thus, PoE integrated circuits tend to be susceptible to damage due to ESD events.

Some PoE integrated circuits have a conventional ESD protection circuit to combat detrimental ESD effects. Unfortunately, when managing an ESD event affecting only one port, conventional PoE ESD protection circuits cause a loss of operation on all ports. Thus, cable systems having multiple ports are particularly vulnerable when one port has a ESD event. Conventional ESD protection circuits also cause a loss of power supplied to the PD when managing an ESD event.

Thus, what is needed is an ESD protection circuit for PoE devices that overcomes the shortcomings described above.

BRIEF SUMMARY OF THE INVENTION

In one embodiment, the present invention includes a first diode with an anode coupled to a positive power port and a cathode coupled to an ESD protection port. A second diode has an anode coupled to ground and a cathode coupled to the positive power port. A third diode has an anode coupled to a negative power port and a cathode coupled to the ESD protection port.

Additional features and advantages of the invention are set forth in the description that follows, and in part are apparent from the description, or may be learned by practice of the invention. The advantages of the invention are realized and attained by the structure and particularly pointed out in the written description and claims hereof as well as the appended drawings.

Both the foregoing general description and the following detailed description are exemplary and explanatory and are intended to provide further explanation of the invention as claimed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

The invention is described with reference to the accompanying drawings. The drawing in which an element first appears is typically indicated by the leftmost digit(s) in the corresponding reference number.

DETAILED DESCRIPTION OF THE INVENTION

This specification discloses one or more embodiments that incorporate the features of this invention. The disclosed embodiment(s) merely exemplify the invention. The scope of the invention is not limited to the disclosed embodiment(s). The invention is defined by the claims.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure, or characteristic. Moreover, such phrases are not necessarily referring to the same embodiment. When a particular feature, structure, or characteristic is described in connection with an embodiment, it is understood that it is within the knowledge of one skilled in the art to effect such feature, structure, or characteristic in connection with other embodiments, whether or not explicitly described.

Figure 1:
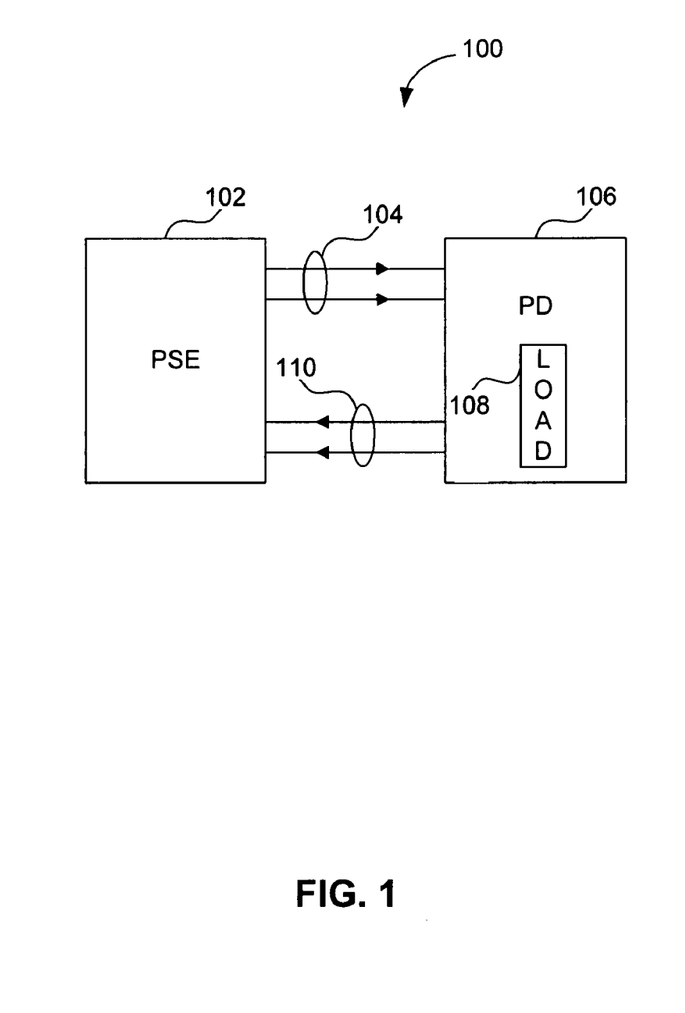
FIG. 1 is a block diagram of a conventional Power over Ethernet (PoE) system.

FIG. 1 illustrates a high level diagram of a conventional Power over Ethernet (PoE) system 100 that provides both DC power and data communications over a common data communications medium. Referring to FIG. 1, power source equipment (PSE) 102 provides DC power over conductors 104, 110 to a powered device (PD) 106 having a representative electrical load 108. The PSE 102 and the PD 106 also include data transceivers that operate according to a known communications standard, such as the IEEE Ethernet standard. More specifically, the PSE 102 includes a physical layer device that transmits and receives high speed data with a corresponding physical layer device in the PD 106, as will be discussed further below. Accordingly, the power transfer between the PSE 102 and the PD 106 occurs simultaneously with the exchange of high speed data over the conductors 104, 110. In one example, the PSE 102 is a data switch having multiple ports that is in communication with one or more PD devices, such as Internet phones, or a wireless access point.

The conductor pairs 104, 110 can carry high speed differential data communications. In one example, the conductor pairs 104, 110 each include one or more twisted wire pairs, or any other type of cable or communications media capable of carrying the data transmissions and DC power transmissions between the PSE 102 and the PD 106. In Ethernet communications, the conductor pairs 104, 110 can include multiple twisted pairs, for example four twisted pairs for 10 Gigabit Ethernet. In 10/100 Ethernet, only two of the four pairs carry data communications and the other two pairs of conductors are unused. Herein, the conductor pairs 104, 110 may be referred to as Ethernet cables or communication links for ease of discussion.

Figure 2A:
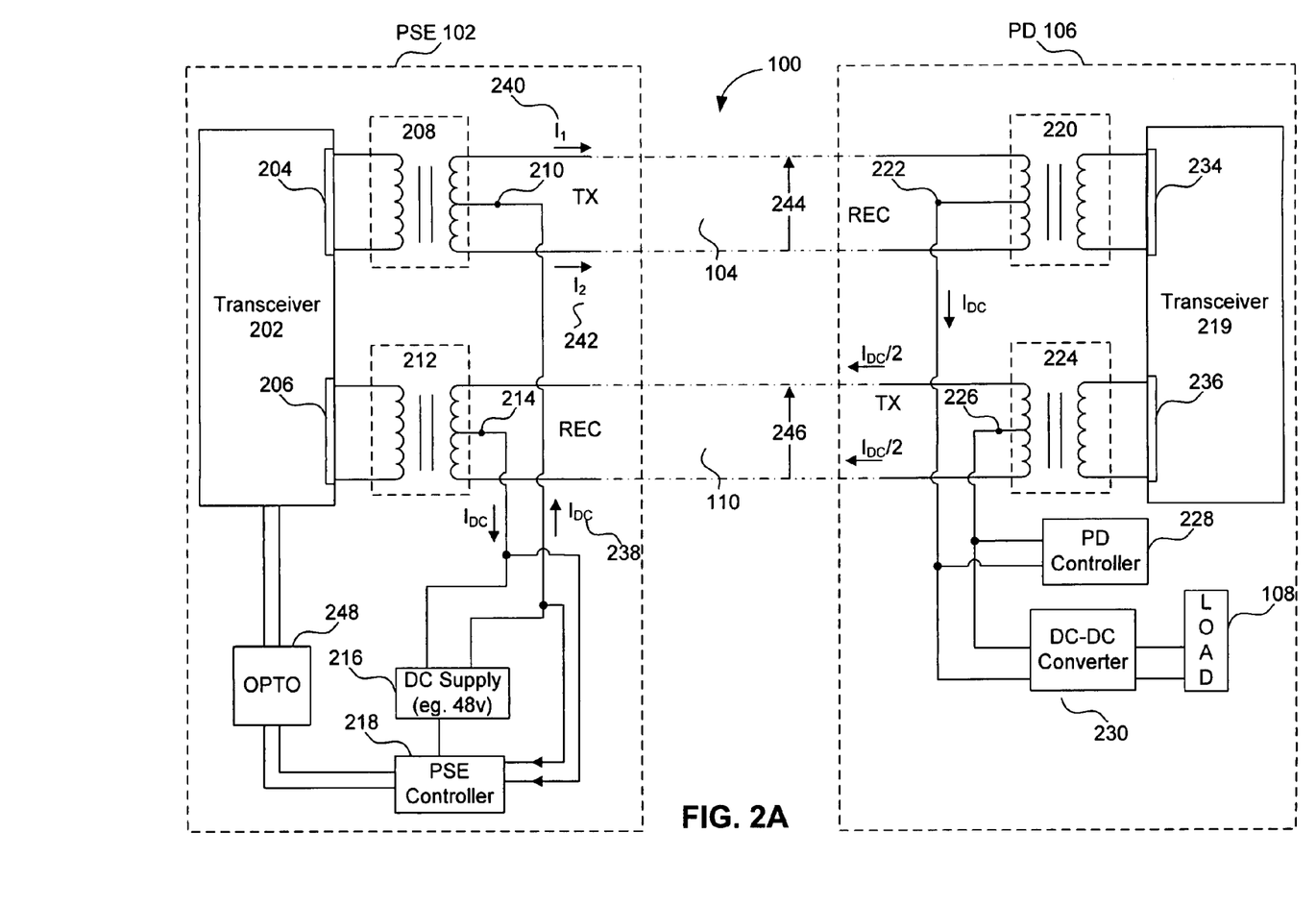
FIG. 2A illustrates a more detailed figure of conventional power transfer from Power Source Equipment (PSE) to a Powered Device (PD) in a conventional PoE communications system.

FIG. 2A provides a more detailed circuit diagram of the PoE system 100, where the PSE 102 provides power to the PD 106 over conductor pairs 104, 110. The PSE 102 includes a transceiver physical layer device (or PHY) 202 having full duplex transmit and receive capability through a differential transmit port 204 and a differential receive port 206. (Herein, transceivers may be referred to as PHYs). A first transformer 208 couples high speed data between the transmit port 204 and the first conductor pair 104. Likewise, a second transformer 212 couples high speed data between the receive port 206 and the second conductor pair 110. The respective transformers 208, 212 pass the high speed data to and from the transceiver 202, but isolate any low frequency or DC voltage from the transceiver ports, which may be sensitive to large magnitude voltages.

The first transformer 208 includes primary and secondary windings, where the secondary winding (on the conductor pair 104 side) includes a center tap 210. Likewise, the second transformer 212 includes primary and secondary windings, where the secondary winding (on the conductor pair 110 side) includes a center tap 214. The DC voltage supply 216 generates an output voltage that is applied across the respective center taps 210, 214 of the transformers 208, 210 on the conductor pair sides of the transformers. The center tap 210 is coupled to a first output of a DC voltage supply 216, and the center tap 214 is coupled to a second output of the DC voltage supply 216. As such, the transformers 208, 212 isolate the DC voltage from the DC supply 216 from the sensitive data ports 204, 206 of the transceiver 202. An example DC output voltage is substantially 48 volts, but other voltages could be used depending on the voltage/power requirements of the PD 106.

The PSE 102 further includes a PSE controller 218 that controls the DC voltage supply 216 based on the dynamic needs of the PD 106. More specifically, the PSE controller 218 measures the voltage, current, and temperature of the outgoing and incoming DC supply lines to characterize the power requirements of the PD 106. The PSE Controller 218 is optionally coupled to the transceiver 202 via an optocoupler 248 to isolate the transceiver 202 from the PSE Controller 218.

Further, the PSE controller 218 detects and validates a compatible PD 106, determines a power classification signature for the validated PD 106, supplies power to the PD 106, monitors the power, and reduces or removes the power from the PD 106 when the power is no longer requested or required. During detection, if the PSE 102 finds the PD 106 to be non-compatible, the PSE 102 can prevent the application of power to the PD 106, protecting the PD 106 from possible damage. The IEEE has imposed standards on the detection, power classification, and monitoring of a PD 106 by a PSE 102 in the IEEE 802.3af™ standard, which is incorporated herein by reference.

Still referring to FIG. 2A, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor pair side) includes a center tap 222. Likewise, the fourth transformer 224 includes primary and secondary windings, where the secondary winding (on the conductor pair side) includes a center tap 226. The center taps 222 and 226 supply the power carried over the conductor pairs 104 and 110 to the representative load 108 of the PD 106, where the load 108 represents the dynamic power draw needed to operate the PD 106. A DC-DC converter 230 may be optionally coupled before the load 108 to step down the voltage as necessary to meet the voltage requirements of the PD 106. Further, multiple DC-DC converters 230 may be arrayed in parallel to output multiple different voltages (such as 3 volts, 5 volts, 12 volts) to supply different loads 108 of the PD 106.

The PD 106 further includes a PD controller 228 that monitors the voltage and current on the PD 106 side of the PoE configuration. The PD controller 228 further provides the necessary impedance signatures on the return conductor 110 during initialization, so that the PSE controller 218 will recognize the PD 106 as a valid PoE device, and be able to classify power requirements of the PD 106.

During ideal operation, a direct current ($I_{DC}$) 238 flows from the DC power supply 216 through the first center tap 210, and divides into a first current ($I_1$) 240 and a second current ($I_2$) 242 that is carried over the conductor pair 104. The first current ($I_1$) 240 and the second current ($I_2$) 242 then recombine at the third center tap 222 to reform the direct current ($I_{DC}$) 238 to power the PD 106. On return, the direct current ($I_{DC}$) 238 flows from the PD 106 through the fourth center tap 226, and divides for transport over the conductor pair 110. The return DC current recombines at the second center tap 214, and returns to the DC power supply 216. As discussed above, data transmission between the PSE 102 and the PD 106 occurs simultaneously with the DC power supply 216 described above. Accordingly, a first communication signal 244 and/or a second communication signal 246 are simultaneously differentially carried via the conductor pairs 104 and 110 between the PSE 102 and the PD 106. It is important to note that the communication signals 244 and 246 are differential signals that ideally are not effected by the DC power transfer.

Figure 2B:
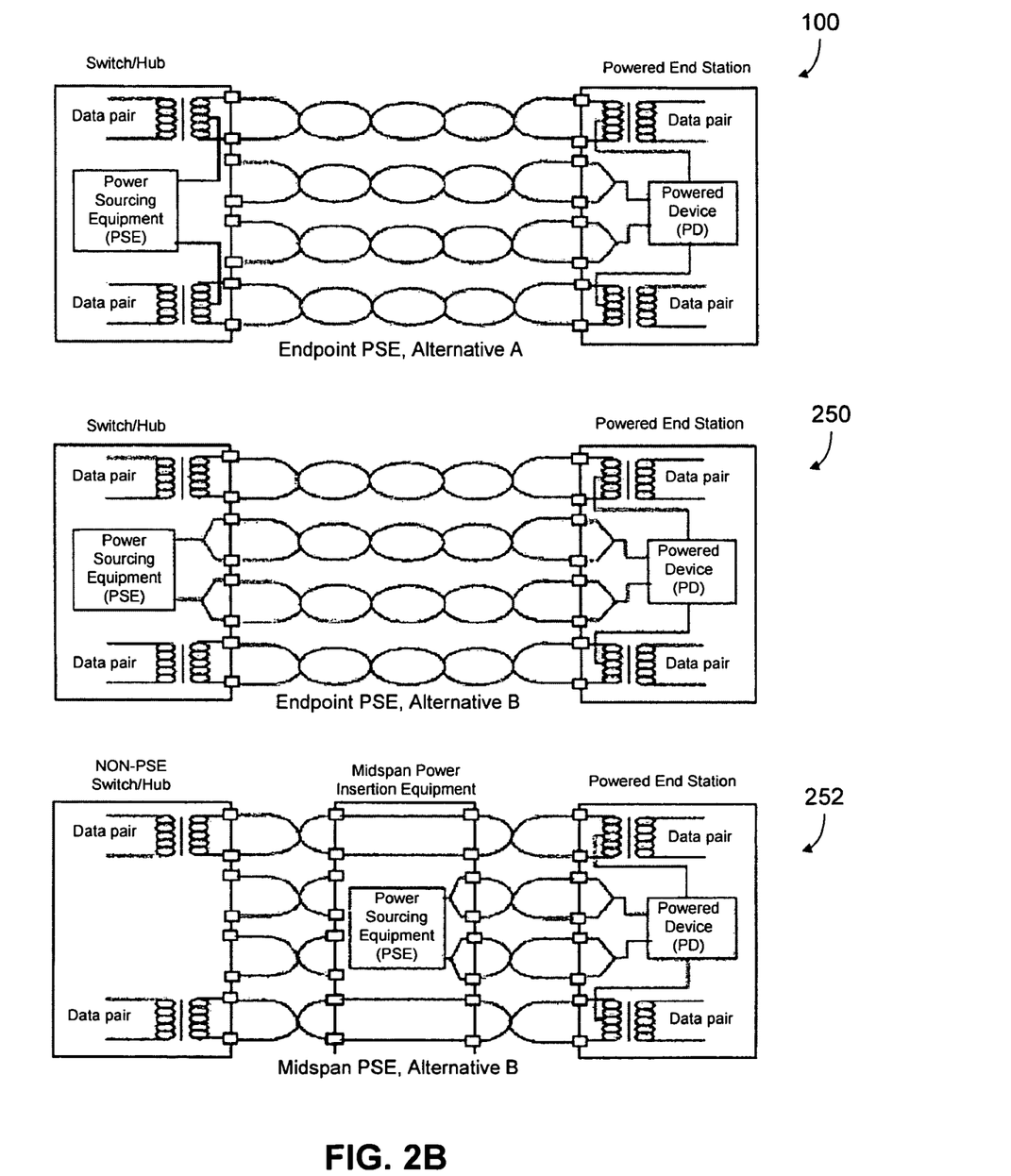
FIG. 2B illustrates exemplary configurations for power transfer from Power Source Equipment (PSE) to a Powered Device (PD) in a PoE communications system.

FIG. 2A represents an Alternative A configuration for supplying power to a PD. Persons of skill in the art would appreciate other alternative configurations can be used to supply power to a PD. For example, FIG. 2B illustrates exemplary configurations for supplying power from the Power Source Equipment (PSE) to the Powered Device (PD) in a conventional PoE communications system. The Endpoint PSE, Alternative A configuration 100 is the configuration for supplying power from the PSE to the PD as previously described in FIG. 2A. The Endpoint PSE, Alternative B configuration 250 represents a configuration for supplying power from the PSE to the PD where two of the pairs of conductors carry data and the remaining two pairs of conductors are used to power the PD. More specifically, the two center pairs of conductors carry the power only, and the two outer pairs of conductors carry the data only. Accordingly, the center pair of conductors does not require transformers because the data and power are carried on separate dedicated conductor pairs. The Midspan PSE, Alternative B 252 represents a third configuration for supplying power from the PSE to the PD. In the Midspan configuration, the midspan includes the PSE and applies the power to data from a non-PSE switch/hub so that the non-PSE switch/hub can interface with a PD device as shown in Alternative 252. As shown, the data and power are carried on separate conductors. Further description of the Midspan PSE, Alternative B 252 is given in United States Patent Application entitled "Inband Management for Power Over Ethernet Midspan Using an Embedded Switch", application Ser. No. 11/518,942, filed on Sep. 12, 2006, which is incorporated by reference in its entirety. The PSE controller described in the following description can be used in any one of the alternatives PoE configurations described in FIG. 2A or 2B.

Figure 3:
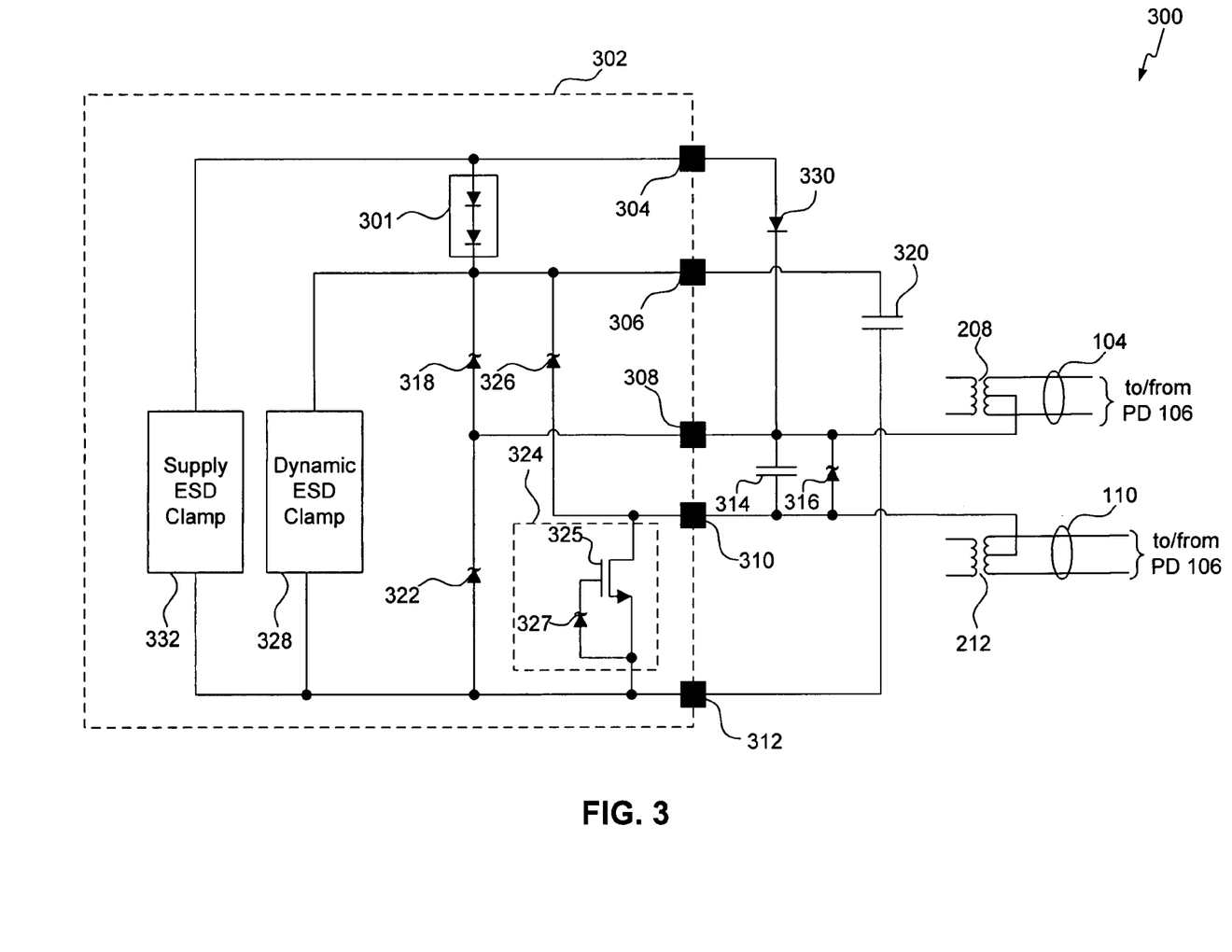
FIG. 3 illustrates a PoE electrostatic discharge (ESD) protection circuit.

FIG. 3 illustrates a PoE ESD protection circuit 300. The PoE ESD protection circuit 300 protects against ESD by providing a controlled discharge path. The PoE ESD protection circuit 300 protects against ESD such as positive ESD, negative ESD, and human-source ESD.

The PoE ESD protection circuit 300 must not detrimentally affect normal PoE operation. Thus, ESD protection devices in the ESD protection circuit 300 have triggering thresholds that are higher than PoE integrated circuit and board operating voltages. Triggering thresholds are higher than external ESD protection levels to minimize discharge exposure. Conversely, triggering thresholds and clamping voltages are lower than spark gap voltages of circuits internal to the PoE integrated circuit so that the PoE ESD protection circuit 300 protects these internal circuits.

At least a part of the PoE ESD protection circuit 300 is deposited on a substrate 302 in common with the PoE integrated circuit. Other components are located off of the substrate 302. At least one port couples the on-substrate and off-substrate components. The ports may include a power supply port 304, an ESD protection port 306, a positive power port 308, a negative power port 310, and a ground port 312. Off-substrate components may include the first transformer 208, the second transformer 212, and an Ethernet connector, such as an RJ45 connector coupled to the secondary winding of at least one of the first transformer 208 and the second transformer 212. Only one Ethernet port is illustrated in FIG. 3, PSE 102 may contain multiple Ethernet ports.

Further, at least one of the positive power port 308, the negative power port 310, and the ground port 312 may be part of PSE coupled to the PD 106 per the Endpoint PSE, Alternative B configuration 250. Alternatively, at least one of the positive power port 308, the negative power port 310, and the ground port 312 are part of PSE coupled to the PD 106 per the Midspan PSE, Alternative B configuration 252. Thus, an electrostatic discharge path is not always via one of the transformers 208, 212, 220, 224.

The PoE ESD protection circuit 300 may be coupled to a control circuit, such as the PSE controller 218, that determines a presence of an ESD event. When the ESD event is detected, a record of the event is recorded by the control circuit. Detection of the event is used as an input to a decision made by the control circuit.

The PoE ESD protection circuit 300 may contain an AC disconnect circuit 301, such as an AC disconnect chargepump overvoltage comparator. An ESD event may trigger the comparator and indicate a false disconnection of AC power. If this occurs, a record of the ESD event is recorded by the control circuit.

1. ESD Protection Between a Positive and a Negative Power Port

The PoE ESD protection circuit 300 protects the PoE integrated circuit against ESD between the positive power port 308 and the negative power port 310. During a positive ESD event where a voltage on the positive power port 308 is greater than a voltage on the negative power port 310 due to ESD, a capacitor 314 charges with the ESD energy. The ESD differential protection diode 316 limits an ESD voltage between the positive power port 308 and the negative power port 310. When the reverse bias on the ESD differential protection diode 316 reaches an avalanche breakdown voltage, current flows from cathode to anode in the ESD differential protection diode 316. When the ESD differential protection diode 316 operates in breakdown, current flows from the positive power port 308 to the negative power port 310 to limit the ESD voltage between the positive power port 308 and the negative power port 310. During normal operation, the ESD differential protection diode 316 is reverse biased, but does not operate in breakdown because the breakdown voltage is greater in magnitude than the voltage between the positive power port 308 and the negative power port 310. The ESD differential protection diode 316 may be a transzorb high-power density ESD diode such as an SMAJ58A or equivalent.

During a negative ESD event where a voltage on the negative power port 310 is greater than a voltage on the positive power port 308, the capacitor 314 charges with the ESD energy. The ESD differential protection diode 316 limits an ESD voltage between the negative power port 310 and the positive power port 308. The ESD voltage forward biases the ESD differential protection diode 316. Thus, the ESD differential protection diode 316 conducts to provide a discharge path for the ESD. Providing a discharge path and limiting the ESD voltage protects the PoE integrated circuit from damage. Additionally, the PoE ESD protection circuit 300 prevents loss of all ports for an ESD event between the positive power port 308 and the negative power port 310.

2. ESD Protection Between a Positive Power Port and a Ground Port

The PoE ESD protection circuit 300 protects the PoE integrated circuit against ESD between the positive power port 308 and the ground port 312. During a positive ESD event where a voltage on the positive power port 308 is greater than the ground port 312 due to an electrostatic charge, the ESD voltage causes a first diode 318 to become forward biased. Thus, a voltage on the ESD protection port 306 increases relative to the ground port 312 and an ESD buffer capacitor 320 charges with the ESD energy. This provides a discharge path for the ESD energy. The ESD buffer capacitor 320 may be a ceramic capacitor with a low effective series resistance (ESR), such as an ESR of less than 0.1 ohms.

The first diode 318 also prevents ESD energy from flowing from the ESD protection port 306 to the positive power port 308. During an ESD event involving the ESD protection port 306, the first diode 318 limits the ESD buffer capacitor 320 from discharging via, and thus disabling, the positive power port 308. The first diode 318 is a high voltage ESD diode or equivalent. The first diode 318 may have an avalanche voltage specification of substantially 80 volts.

The second diode 322 limits the ESD voltage between the positive power port 308 and the ground port 312. When the reverse bias across the second diode 322 reaches an avalanche breakdown voltage, current flows from cathode to anode in the second diode 322. When the second diode 322 operates in breakdown, current flows from the positive power port 308 to the ground port 312 to limit the ESD voltage between the positive power port 308 and the ground port 312. During normal operation, the second diode 322 is reverse biased, but does not operate in breakdown because the breakdown voltage is greater in magnitude than the voltage between the positive power port 308 and the ground port 312. The second diode 322 is a high voltage ESD diode or equivalent. The second diode 322 may have an avalanche voltage specification of substantially 80 volts.

During a negative ESD event where a voltage on the positive power port 308 is less than the ground port 312, the ESD voltage forward biases the second diode 322. The second diode 322 conducts to provide a discharge path for the ESD. Providing a discharge path and limiting the ESD voltage protects the PoE integrated circuit from damage. Additionally, the PoE ESD protection circuit 300 prevents loss of all ports for an ESD event between the positive power port 308 and the ground port 312.

3. ESD Protection Between a Negative Power Port and a Ground Port

The PoE ESD protection circuit 300 protects the PoE integrated circuit against ESD between the negative power port 310 and the ground port 312. During a positive ESD event where an ESD voltage on the negative power port 310 is greater than the ground port 312, the third diode 326 is forward biased. Thus, the electrostatic voltage charges the ESD buffer capacitor 314 with the ESD energy. During an ESD event involving the ESD protection port 306, the third diode 326 limits the ESD buffer capacitor 320 from discharging via, and thus disabling, the negative power port 310. The third diode 326 is a high voltage ESD diode or equivalent. The third diode 326 may have an avalanche voltage specification of substantially 80 volts.

An active clamp 324 limits an electrostatic voltage between the negative power port 310 and the ground port 312. The active clamp 324 includes an NMOS transistor 325 and a diode 327. The diode 327 is a clamping diode that limits a voltage on a gate of the NMOS transistor 325. The NMOS transistor 325 has an internal capacitance between a gate and a drain. The drain of the NMOS transistor 325 is coupled to the negative power port 310. The source and backgate of the NMOS transistor 325 are coupled to the ground port 312. The electrostatic voltage between the negative power port 310 and the gate increases across the NMOS transistor's internal capacitance. The diode 327 is reverse biased and provides a resistance across which the gate voltage may increase relative to the ground port 312. When the electrostatic voltage is high enough, the electrostatic voltage causes the NMOS transistor 325 to conduct and discharge the ESD to the ground port 312. Thus, the NMOS transistor 325 provides a discharge path and limits an ESD voltage across the ESD buffer capacitor 314. The NMOS transistor 325 may be a VFNDM80, VFNDM80A, or equivalent.

During a negative ESD event where a voltage on the negative power port 310 is less than the ground port 312, the third diode 326 is reverse biased. The NMOS transistor 325 has a parasitic diode between it's drain and the substrate 302. The parasitic diode is forward biased with the substrate as an anode and the drain as a cathode. The substrate is coupled to ground. Thus, the parasitic diode conducts to provide a discharge path for the ESD. Providing a discharge path and limiting the ESD voltage protects the PoE integrated circuit from damage. Additionally, the PoE ESD protection circuit 300 prevents loss of all ports for an ESD event between the negative power port 310 and the ground port 312.

4. Protection from Human-Source ESD

An electrostatic charge may develop across a human body. The Human Body Model (HBM) is used to characterize ESD from a human source. Under the HBM, an electrostatic charge may have a voltage of up to 2 kV. Human-source ESD is likely to occur during handling of the PoE integrated circuit or a device containing the PoE integrated circuit. Human-source ESD may render a PoE integrated circuit inoperative by destroying layers of a sensitive internal circuit.

The PoE ESD protection circuit 300 protects the PoE integrated circuit against human-source ESD without any parts external to the substrate 302. The PoE ESD protection circuit 300 may control discharge of up to 2 kV of human-source ESD. Protection is provided against human-source ESD between the positive power port 308 and the ground port 312. During a human-source ESD event on the positive power port 308, the first diode 318 is forward biased. A dynamic ESD clamp 328 then shunts the ESD to the ground port 312.

Protection is also provided against human-source ESD between the negative power port 310 and the ground port 312. During a human-source ESD event on the negative power port 310, the third diode 326 is forward biased. The dynamic ESD clamp 328 shunts the human-source ESD to the ground port 312. Protection against human-source ESD does not require that the PoE integrated circuit have any external components.

5. Power Supply Port ESD Protection

An ESD event on the power supply port 304 can cause a loss of power supplied to the powered device 106. The PoE ESD protection circuit 300 protects the power supply port 304 of the PoE integrated circuit against ESD without loss of power to other ports. A power supply diode 330 is reverse biased during a positive ESD event on the positive power port 308. Thus, the power supply diode 330 minimizes ESD via the power supply port 304. The static charge is instead discharged via the positive power port 308 as described herein. During a negative ESD event, a power supply ESD clamp 332 provides a discharge path between the ground port 312 and the power supply port 304. During a negative ESD event, the power supply diode 330 is forward biased.

Figure 4:
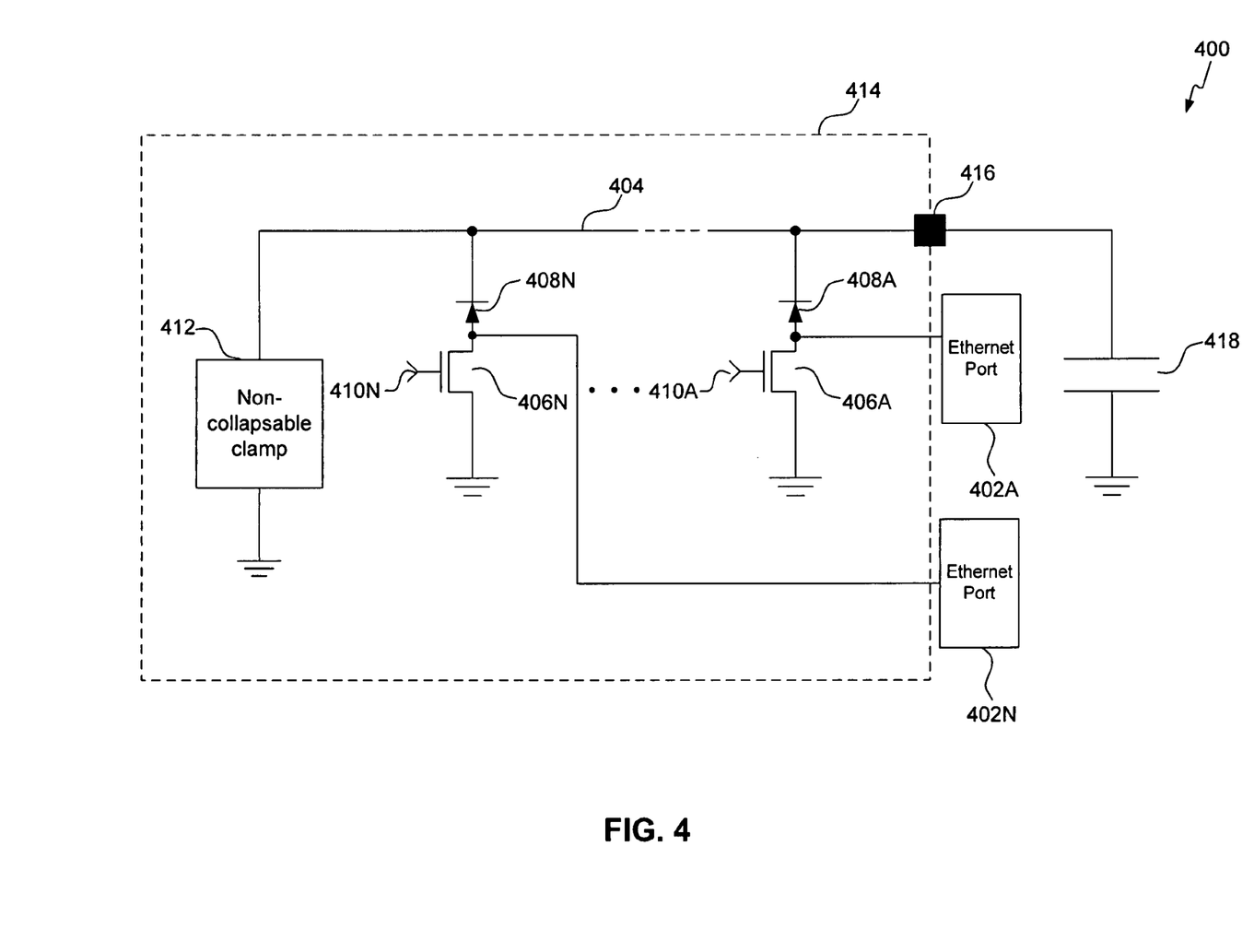
FIG. 4 illustrates an exemplary PoE ESD protection circuit.

FIG. 4 illustrates an exemplary PoE ESD protection circuit 400 which protects Ethernet ports 402A, . . . N from ESD damage. An ESD bus 404 provides a common ESD path in the protection circuit 400. In other words, the ESD bus 404 provides a common discharge path for electrostatic energy from at least one source. In each port, a drain of a transistor 406A, . . . N is coupled to an anode of a diode 408A, . . . N as well as the Ethernet port 402. Each transistor 406 has a gate coupled to a control input 410A, . . . N. In addition, each transistor 406 has a source that is coupled to ground. Further, a non-collapsible clamp 412 is coupled between ground and the ESD bus 404. The diode 408 may be a high voltage ESD diode or equivalent.

At least a part of the ESD protection circuit 400 may be deposited on a substrate 414. Thus, when the substrate 414 is present, the ESD bus 404 is coupled to a port 416 so that off-substrate components, such as a capacitor 418, may be coupled to the ESD bus 404. The capacitor 418 is coupled between the port 416 and ground. Further, a control circuit, such as the PSE controller 218, may be coupled to the non-collapsible clamp 412.

During an ESD event on the Ethernet port 402, the ESD protection circuit 400 provides a discharge path for the electrostatic energy. The electrostatic energy discharges through the diode 408 to the ESD bus 404. The electrostatic energy charges the capacitor 418 from the ESD bus 404. Simultaneously, the non-collapsible clamp 412 limits a voltage across the capacitor 418. The non-collapsible clamp 412 also discharges the electrostatic energy to ground.

When multiple sources of ESD are coupled to the ESD protection bus 404, the diode 408 prevents flow of ESD energy from the ESD protection bus 404 to the Ethernet port 402. Thus, when an ESD event occurs on a specific Ethernet port 402, other Ethernet ports 402 coupled to the common ESD bus 404 are unaffected by the ESD event and do not malfunction due to the ESD event.

The scope of the invention includes all forms of Ethernet configurations and data speeds, including, for example, 10/100 Ethernet, 1 Gigabit Ethernet, and 10 Gigabit Ethernet. However, the invention is not limited to Ethernet communications, and may be utilized in other communications standards or configurations, as will be understood by those skilled in arts based on the discussion provided herein. In other words, the scope of the invention is not limited to Ethernet, and may be used in other communication standards, as will be understood by those skilled in the arts based on the discussion given herein.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A Power over Ethernet (PoE) electrostatic discharge (ESD) protection circuit, comprising:
a first diode having an anode configured to be coupled to a positive power port of a Power over Ethernet (PoE) power supply and a cathode coupled to an ESD protection port;
a second diode having an anode coupled to ground and a cathode configured to be coupled to said positive power port; and
a third diode having an anode configured to be coupled to a negative power port of the Power over Ethernet (PoE) power supply and a cathode coupled to said ESD protection port, wherein said ESD protection port is configured to connect to an ESD discharge path, and wherein the negative power port is associated with the positive power port of the Power over Ethernet (PoE) power supply.

2. The circuit of claim 1, further comprising an ESD clamping device coupled between ground and said ESD protection port to form, at least a part of, the ESD discharge path.

3. The circuit of claim 1, further comprising a capacitor coupled between ground and said ESD protection port to form, at least a part of, the ESD discharge path.

4. The circuit of claim 1, further comprising:
a transceiver; and
a transformer having a primary winding and a secondary winding, wherein said secondary winding has a center tap coupled to said positive power port or said negative power port;
wherein said primary winding is coupled to said transceiver.

5. The circuit of claim 4, further comprising an RJ45 connector coupled to said secondary winding.

6. The circuit of claim 1, further comprising:
an NMOS transistor including:
a drain coupled to said negative power port;
a source coupled to ground;
a gate; and
a fourth diode having an anode coupled to ground and a cathode coupled to said gate.

7. The circuit of claim 1, further comprising:
a ESD differential protection diode having an anode coupled to said negative power port and a cathode coupled to said positive power port; and
a capacitor coupled between said positive power port and said negative power port.

8. The circuit of claim 1, further comprising:
a power supply port; and
a power supply ESD clamp coupled between ground and said power supply port.

9. The circuit of claim 8, further comprising:
a power supply diode having an anode coupled to said power supply port and a cathode coupled to said positive power port.

10. The circuit of claim 1, wherein at least a part of the PoE ESD protection circuit is deposited on a substrate.

11. The circuit of claim 1, further comprising an AC disconnect circuit coupled to the PoE ESD protection circuit.

12. The circuit of claim 1, further comprising a control circuit coupled to the PoE ESD protection circuit.

* * * * *